(12) United States Patent
Itoh et al.

(10) Patent No.: US 7,291,956 B2
(45) Date of Patent: Nov. 6, 2007

(54) LAMINATE COIL AND BRUSHLESS MOTOR USING SAME

(75) Inventors: Hiroyuki Itoh, Tottori-ken (JP); Tadaaki Hourai, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 293 days.

(21) Appl. No.: 10/523,822

(22) PCT Filed: Aug. 7, 2003

(86) PCT No.: PCT/JP03/10069

§ 371 (c)(1),
(2), (4) Date: Feb. 4, 2005

(87) PCT Pub. No.: WO2004/015843

PCT Pub. Date: Feb. 19, 2004

(65) Prior Publication Data

US 2005/0285470 A1     Dec. 29, 2005

(30) Foreign Application Priority Data

Aug. 7, 2002  (JP) ............................ 2002-229522

(51) Int. Cl.
*H02K 17/00* (2006.01)
(52) U.S. Cl. ..................................... 310/208; 310/71
(58) Field of Classification Search ................ 310/268, 310/208, 71, DIG. 6; 336/200, 232
See application file for complete search history.

(56) References Cited

U.S. PATENT DOCUMENTS 5,440,185 A * 8/1995 Allwine, Jr. ............ 310/156.37
7,071,805 B2 * 7/2006 Hasegawa et al. .......... 336/200

FOREIGN PATENT DOCUMENTS

| JP | 58-172345 | 11/1983 |
| JP | 61-247255 | 11/1986 |
| JP | 61-269632 | 11/1986 |
| JP | 61-273142 | 12/1986 |
| JP | 64-059902 | 3/1989 |
| WO | WO 03/049251 A1 | 6/2003 |

* cited by examiner

*Primary Examiner*—Dang Le
(74) *Attorney, Agent, or Firm*—Sughrue Mion Pllc.

(57) ABSTRACT

A laminate coil for an integral n-phase motor (n is a natural number of 2 or more) having pluralities of coil poles formed by patterned conductor coils formed in a laminate constituted by pluralities of insulating layers, the laminate coil comprising input and output terminals formed on an outer surface of the laminate, a first connecting line connecting the input terminal to the coil poles, and second connecting lines series-connecting coil poles having the same polarity, the first and second connecting lines being formed by conductor patterns, and the coil poles being formed on pluralities of insulating layers sandwiched by the first and second connecting lines.

19 Claims, 9 Drawing Sheets

PRIOR ART

Fig. 15

PRIOR ART

Fig. 16

PRIOR ART

LAMINATE COIL AND BRUSHLESS MOTOR
USING SAME

CROSS REFERENCE TO RELATED
APPLICATIONS

This application is a 371 of PCT application serial No. PCT/JP03/10069, filed Aug. 7, 2003 and claims all rights of priority thereto, the PCT Application in turn claimed priority to Japanese Application Serial No. 2002-229522, Aug. 7, 2002.

FIELD OF THE INVENTION

The present invention relates to a small, thin, inexpensive brushless motor, and a laminate coil used therein.

BACKGROUND OF THE INVENTION

The miniaturization of electronic equipments results in stronger demand to provide smaller and thinner motors for use therein. As such a motor, Japanese Utility Model Laid-Open No. 58-172345, for instance, discloses a flat brushless motor comprising stator coils and a rotor having a permanent magnet opposing thereto, stator coils being constituted by laminating pluralities of sheet coils each formed by a spiral conductor pattern formed on an insulating substrate.

Figure 14:
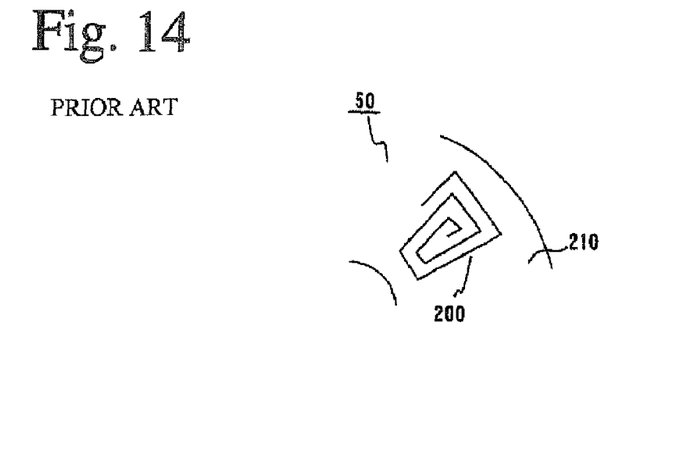
FIG. 14 is a partial enlarged view showing a conventional sheet coil.
Figure 15:
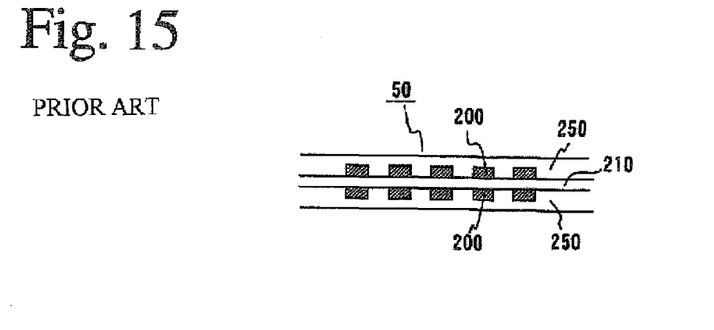
FIG. 15 is a partial cross-sectional view showing a conventional sheet coil.
Figure 16:
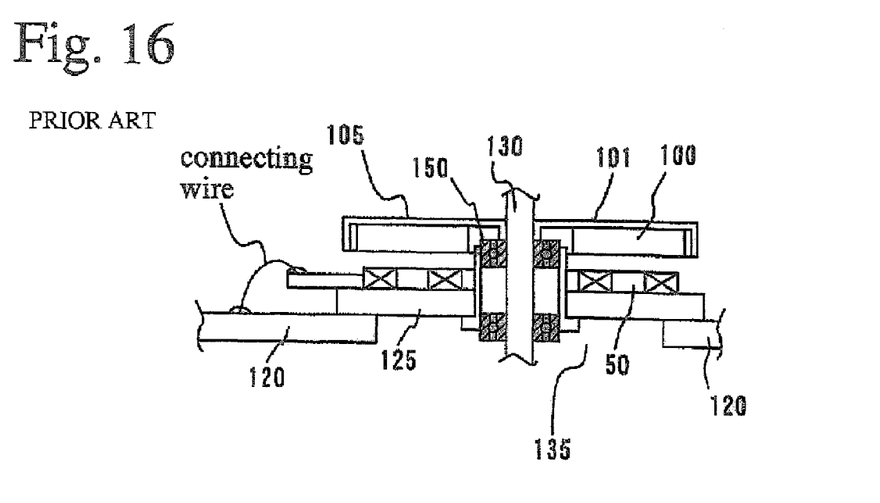
FIG. 16 is a cross-sectional view showing a brushless motor comprising a conventional sheet coil.

In this flat brushless motor, as shown in FIGS. 14 to 16, motor magnetic poles are formed by 3-phase, 8-pole sheet coils 50 fixed to a stator yoke such that they are opposing to a magnetic pole surface of the rotor magnet 100. A single-phase coil is formed by one 8-pole flat coil, and adjacent coil poles 200 are series-connected with opposite polarities facing each other. Pluralities of sheet coils 50 are concentrically laminated, each coil 50 being held by a coil holder 125 such as a yoke, a print circuit board (PCB), etc., and ends of each coil 50 being connected to a pattern surface of a print circuit board (PCB) 120 by solder, etc. Each sheet coil 50 is a toroidal conductor pattern formed on a thin insulating sheet 210 by etching, plating, etc., which is provided with coil poles 200.

JP 64-59902 A discloses a laminate coil for a brushless motor, which is obtained by forming as coil sheets coil conductor patterns on green sheets formed by ceramic powder, for instance, by a screen printing method, etc., laminating pluralities of coil sheets, providing connection between the coil conductor patterns via through-holes, and integrally burning the coil conductor patterns with the green sheets.

However, such conventional coils suffer from the following problems. In the coil disclosed by Japanese Utility Model Laid-Open No. 58-172345, because three-phase coils are obtained by forming toroidal pattern conductors for coil poles on thin insulating sheets by etching, plating, etc., and disposing them with displacement of a predetermined angle in a circumferential direction, (1) laminated coil layers should be bonded by uniform adhesive layers; (2) positional displacement between the bonded coil layers causes short-circuiting, etc. between the coil poles, resulting in the likelihood of uneven rotation and torque ripple; (3) sheets of polyimides, polyesters, etc. used as insulating sheets have limited mechanical strength, generally necessitating the insulating sheets to be disposed on the PCB or the yoke, thereby making further miniaturization and thinning difficult.

In the laminate coil of JP 64-59902 A, in which green sheet substrates having external terminal electrodes are laminated with pluralities of coil sheets, circular portions, on which coils are formed, and rectangular portions, on which external terminal electrodes are formed, are different in thickness, so that the laminate coil cannot be produced at a high productivity. In addition, to provide the external terminal electrodes with improved mechanical strength, green sheet substrates having no coil conductor patterns formed should be thick, resulting in a thicker laminate coil. In addition, the existence of the external terminal electrodes enlarges the area of the laminate coil, resulting in a larger brushless motor.

OBJECT OF THE INVENTION

Accordingly, an object of the present invention is to provide a small, thin laminate coil having high strength and productivity and excellent motor efficiency free from uneven rotation and torque ripple, and a brushless motor comprising such a laminate coil.

DISCLOSURE OF THE INVENTION

The first laminate coil for an integral n-phase motor (n is a natural number of 2 or more) according to the present invention has pluralities of coil poles formed by patterned conductor coils formed in a laminate constituted by pluralities of insulating layers, comprising input and output terminals formed on an outer surface of the laminate, a first connecting line connecting the input terminal to the coil poles, and second connecting lines series-connecting coil poles having the same polarity, the first and second connecting lines being formed by conductor patterns, and the coil poles being formed on pluralities of insulating layers sandwiched by the first and second connecting lines.

The number of coil poles is preferably an integral multiple of n and equal in each phase. The number n of phases of the motor may be a natural number of 2 or more. When n is 2 or 3, the motor can be miniaturized with stable characteristics.

In the preferred embodiment, the laminate has a through-hole for receiving a rotation shaft and/or a bearing of a brushless motor substantially in a center portion thereof. The center of through-hole is substantially aligned with the center of the rotor shaft. The first connecting line comprises an annular conductor portion surrounding the through-hole, a first conductor portion connecting the annular conductor portion to an input terminal, and second conductors extending from the annular conductor portion and connected to coil poles. The input terminal, the output terminal and the first connecting line are preferably formed on one main surface of the laminate. Each of the second connecting lines has two arcuate portions having different radii and a radial portion connecting the two arcuate portions.

The annular conductor portion of the second connecting line arranged such that it surrounds the through-hole does not hinder the rotation of the motor. With the second conductors connected to the coil poles and the first conductor portion connected to the input terminal radially extending from the annular conductor portion, the effective length of the coil increases if slightly, resulting in an improved motor performance.

In the laminate coil of the present invention, the coils constituting multiple-phase coil poles are formed on a surface of the same layer, and arranged at symmetric positions of 180° with the motor shaft as a center such that adjacent coils do not constitute coil poles having the same polarity, and connected by the second connecting lines. Such structure provides the coil poles having large numbers of winding, and improves the motor characteristics because a gap between each coil pole and the permanent magnet of the rotor can be substantially the same. To obtain the stable rotation of the motor, the total number of coil poles is preferably the same in each phase.

In the preferred embodiment of the present invention, the input and output terminals and the first connecting line are formed on one main surface of the laminate, making connection to the print circuit board (PCB) easy. The input and output terminals are preferably in a land grid array (LGA) or a ball grid array (BGA).

The second laminate coil for an integral three-phase motor according to the present invention comprises pluralities of coil poles formed by patterned conductor coils in a laminate constituted by pluralities of insulating layers, the laminate being formed in the shape of a quadrangular plate, and each of one input terminal and three output terminals being formed at four different corners on the same main surface of the laminate.

Though the laminate coil may be annular because the coil poles are annularly formed around the motor shaft, an annular structure needs other means such as die-punching, etc., making the production steps of each laminate coil complicated. On the other hand, the laminate in the shape of a quadrangular plate makes it easy to form each laminate coil from a laminate substrate comprising pluralities of laminates, as described later.

With the input and output terminals formed at four different corners on the same main surface of the laminate in the shape of a quadrangular plate such that they do not overlap the coil poles in a lamination direction, the laminate coil can be miniaturized without deteriorating the motor performance. Because the input and output terminals can be made relatively large, it is possible to have improved terminal connection strength with the PCB, thereby effectively utilizing portions not occupied by the coil poles in the laminate.

In the first and second laminate coils, the coil poles are constituted by connecting coils formed on pluralities of insulating layers such that they overlap in a lamination direction. The coil is preferably constituted at least by a first coil wound clockwise from inside to outside and a second coil wound clockwise from outside to inside, the first coil and the second coil being connected via a through-hole formed in the laminate, whereby the first and second coils have the same winding direction.

With such structure, the first and second coils function as one coil pole when electric current is supplied in a constant direction. Accordingly, the coil pole has a large number of winding, providing a motor with a higher torque.

Different-phase coil poles are preferably arranged around the motor shaft at an equal angular interval. The coil poles having the same polarity are preferably arranged at rotationally symmetric positions at 180° around the rotation center of the motor shaft. The arrangement of the coil poles having substantially the same size around the motor shaft at an equal angular interval causes each coil pole to generate a counter electromotive force symmetrically around the motor shaft, resulting in an improved precision of the motor rotation.

The coil is preferably a fan-shaped spiral coil having an open angle of 55° or less with the motor shaft as a center. With the fan-shaped spiral coil arranged around the motor shaft as a center, line portions radially extending from the rotation shaft as a center preferably correspond to an effective coil length contributing to torque characteristics, resulting in a high torque. The open angle of the spiral coil is determined by the width of a conductor pattern constituting the spiral coil, the numbers of coils and phases in the motor, etc. In the case of a three-phase, six-pole motor, the upper limit of the open angle is preferably 55°.

The brushless motor of the present invention comprises the above laminate coil as a stator, the laminate coil being arranged such that it opposes via a magnetic gap a rotor comprising a permanent magnet having alternately different magnetic poles. The brushless motor preferably comprises electric signal controllers for periodically supplying electric current in every different-phase coil poles in the laminate coil.

BEST MODE FOR CARRYING OUT THE INVENTION

[1] First Embodiment

Figure 1:
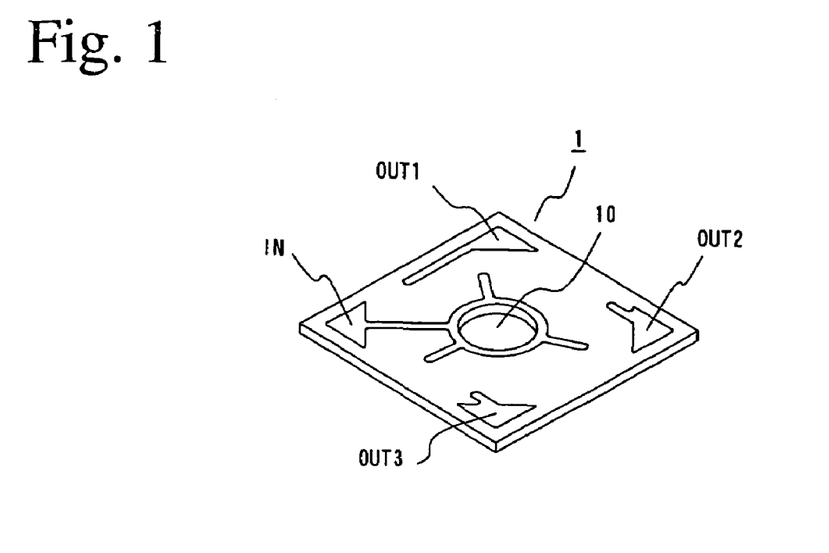
FIG. 1 is a perspective view showing a laminated coil according to one embodiment of the present invention.
Figure 2:
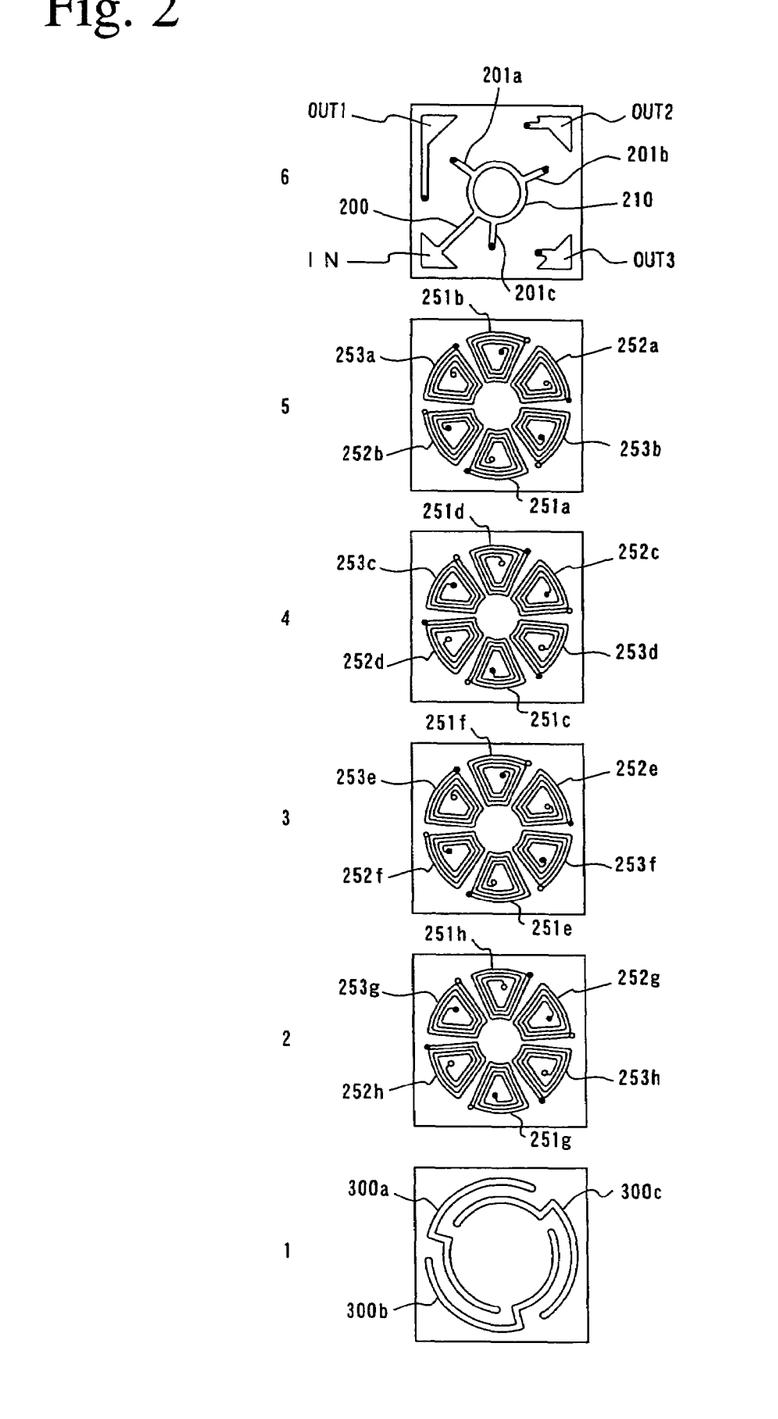
FIG. 2 is an exploded view showing the internal structure of the laminated coil shown in FIG. 1.

FIG. 1 is a perspective view showing the laminate coil 1 according to the first embodiment, and FIG. 2 is an exploded view showing its internal structure. This laminate coil 1, which integrally comprises pluralities of coil poles, may be formed by printing a conductive paste based on Ag, Cu, etc. on green sheets of a low-temperature co-fired ceramic (LTCC) having a thickness of 20 to 200 µm to form desired conductor patterns, and laminating and burning pluralities of green sheets having conductor patterns. The conductor patterns constituting the coil poles are preferably as wide as about 100 to 400 µm.

Figure 9:
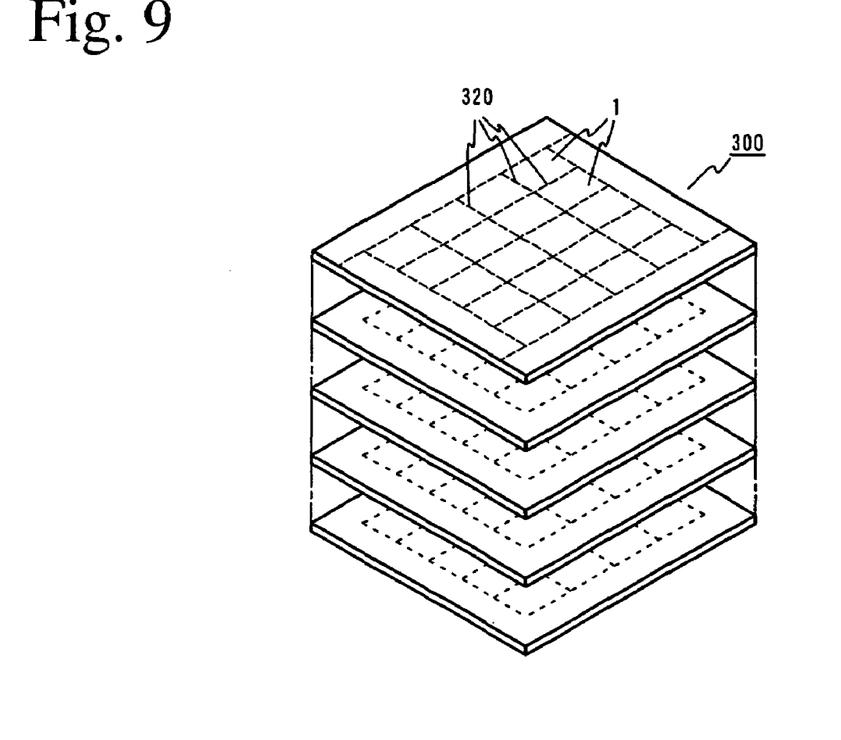
FIG. 9 is an exploded perspective view showing one example of methods for producing the laminate coil of the present invention.
Figure 10:
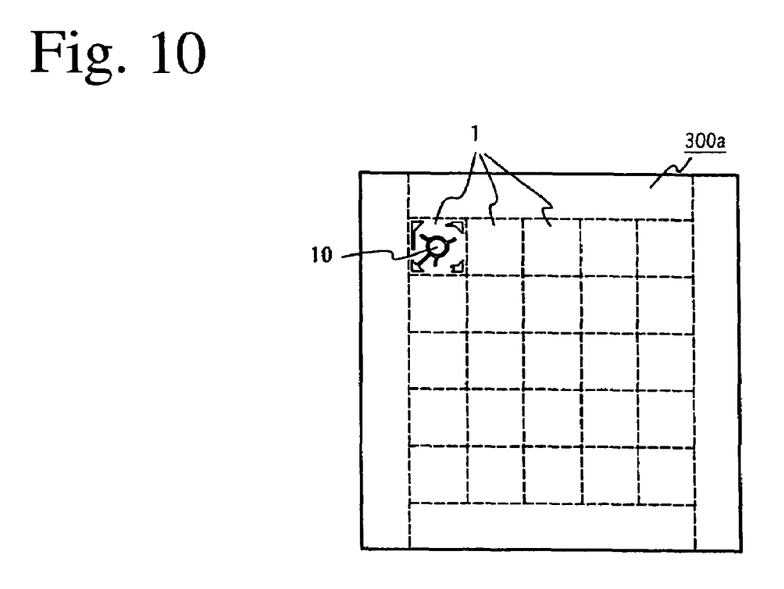
FIG. 10 is a plan view showing a laminate substrate, on which pluralities of laminate coils of the present invention are formed.

One example of methods for producing the laminate coil of the present invention will be explained in detail referring to FIGS. 9 and 10. First, a ceramic slurry comprising ceramic powder, a binder and a plasticizer is applied onto a carrier film made of polyethylene terephthalate, etc. in a uniform thickness by a known sheet-forming method such as a doctor blade method, etc., to form a green sheet as thick as several tens to hundreds of micron meters. The dried green sheet is cut to a predetermined size without removing the carrier film.

The ceramic powder may be, for instance, (a) a low-temperature-sinterable dielectric material comprising $Al_2O_3$ as a main component, and at least one of $SiO_2$, SrO, CaO, PbO, $Na_2O$ and $K_2O$ as an additional component, (b) a low-temperature-sinterable dielectric material comprising $Al_2O_3$ as a main component, and at least one of MgO, $SiO_2$ and GdO as an additional component, or (c) a low-temperature-sinterable magnetic ceramic material comprising at least one of $Bi_2O_3$, $Y_2O_3$, $CaCO_3$, $Fe_2O_3$, $In_2O_3$ and $V_2O_5$, etc.

This embodiment used a dielectric ceramic comprising Al, Si, Sr and Ti as main components and Bi as an additional component. The main components of this dielectric ceramic were 10 to 60% by mass (based on $Al_2O_3$) of Al, 25 to 60% by mass (based on $SiO_2$) of Si, 7.5 to 50% by mass (based on SrO) of Sr, and 20% by mass or less (based on $TiO_2$) of Ti, assuming that the total is 100% by mass. The additional component was 0.1 to 10% by mass (based on $Bi_2O_3$) of Bi, per 100% by mass of the main components.

This dielectric ceramic has a dielectric constant of 7 to 9, a three-point bending strength of 240 MPa or more (measured according to JIS R 1601 on a sample of 36 mm in length, 4 mm in width, 3 mm in thickness, and 30 mm in distance between fulcrums), and a Young's modulus of 110 GPa or more, indicating that it has high bending strength and Young's modulus as LTCC.

After forming conductor patterns for coils (not shown), input and output terminals, etc. described later on such green sheets, they were laminated in a predetermined order and compressed to form a planar laminate 300 having a thickness of about 0.4 mm. Through-holes (not shown) were formed in the green sheets to properly connect the conductor patterns on the different sheets, thereby connecting coil poles. The laminate was punched in a portion corresponding to a motor shaft by a die, and worked by laser to form a through-hole 10 having a diameter of 2 mm.

Formed on a main surface of the planar laminate 300 by a steel blade were pluralities of parallel dividing grooves 320, and pluralities of dividing grooves 320 perpendicular to these dividing grooves 320 each as deep as 0.1 mm. The depth of the dividing grooves 320 is preferably within a range of 50 to 300 µm for easiness of division, handling, etc. Thereafter, the planar laminate 300 was degreased and sintered to form a laminate substrate 300a (assembly of laminate coils) of 65 mm×60 mm×0.3 mm. Input and output terminals, etc. of the laminate coil formed on an outer surface of the laminate substrate 300a were plated with Ni and Au by an electroless plating method. After plating, the laminate substrate 300a was divided along the grooves 320 to provide laminate coils 1 of 8 mm×8 mm×0.3 mm for brushless motors as shown in FIG. 1.

Referring to FIG. 2, the internal structure of the laminate coil will be explained in a lamination order. This laminate coil is used for a brushless motor using a three-phase driving power source, having an equivalent circuit shown in FIG. 3.

Formed on a lowermost layer (first layer) are second connecting lines 300a, 300b, 300c for connecting coil poles having the same polarity. The second connecting lines 300a, 300b, 300c are arranged around a motor shaft described later at an equal angular interval. Each second connecting line is constituted by two arcuate portions extending around the motor shaft as a center, and radial portions connecting the two arcuate portions.

The second connecting lines 300a, 300b, 300c having the above structure connect coil poles having the same polarity, which are arranged at rotationally symmetric positions with respect to the rotation center of the motor shaft. Because the two arcuate portions are arranged on a circumference having a center at the motor shaft, the torque characteristics of the motor are improved if slightly, without hindering the rotation characteristics of the motor.

Though the second connecting lines are formed inside the laminate, they may be formed by printing or transferring a conductive paste on or onto the main surface of the laminate. In that case, at least one green sheet can be omitted, resulting in a thinner laminate coil.

Figure 4A:
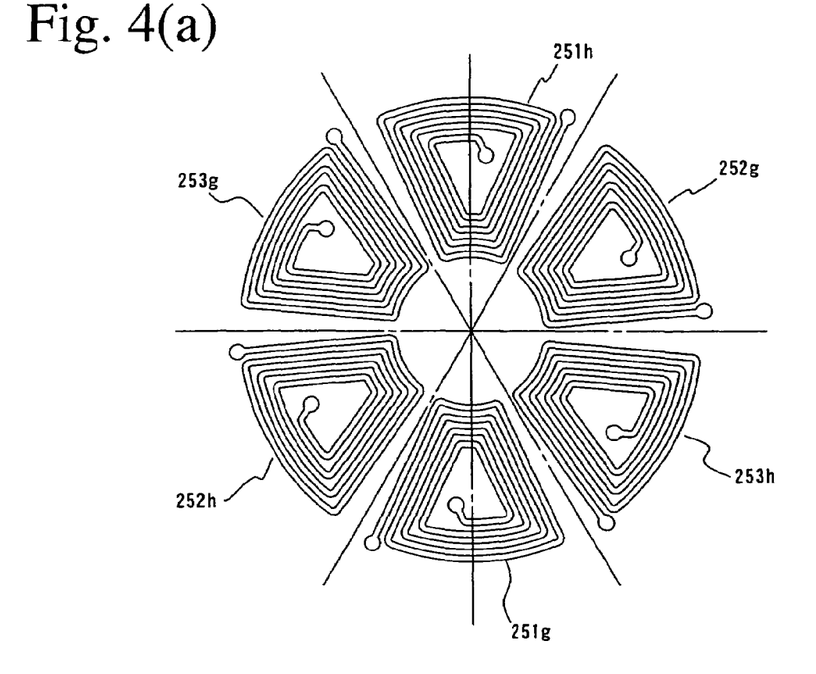
FIG. 4(a) is an enlarged plan view showing an example of pluralities of coils formed on an insulator layer of the laminated coil of the present invention.

Laminated on the first layer is a second layer, on which pluralities of coils are formed. These coils are arranged around the motor shaft at an equal angular interval, constituting multiple-phase coil poles. FIG. 4(a) is an enlarged plan view showing pluralities of coils formed on the second layer.

In this embodiment, six coils 251g, 252g, 253g, 251h, 252h, 253h constituting three-phase coil poles are formed on the same layer at an interval of 60°.

The above six coils are constituted by the first coil patterns 251h, 252h, 253h and the second coil patterns 251g, 252g, 253g. The first coil patterns 251h, 252h, 253h are wound clockwise from outside to inside, and have through-holes (shown by black circles in FIG. 2) for connecting the second connecting lines at outer ends. The second coil patterns 251g, 252g, 253g are wound clockwise from outside to inside, and have through-holes for connecting the second connecting lines at inner ends.

As shown in FIG. 4(a), the first coil patterns 251h, 252h, 253h and the second coil patterns 251g, 252g, 253g are arranged around the motor shaft alternately. Both of the first coil patterns 251h, 252h, 253h and the second coil patterns 251g, 252g, 253g are wound clockwise from outside to inside, and these are called the second coils in the laminate coil of the present invention.

In this embodiment, coil patterns having rotational symmetry of 180° with respect to the motor shaft are series-connected by the second connecting lines, resulting in coil poles having the same polarity. Namely, the first coil pattern 251h and the second coil pattern 251g are connected via the second connecting line 300a, the first coil pattern 252h and the second coil pattern 252g are connected via the second connecting line 300b, and the first coil pattern 253h and the second coil pattern 253g are connected via the second connecting line 300c, respectively constituting coil poles. In other words, the connecting line 300a constitutes a middle point of the second-phase coil pole 61 shown in FIG. 3, the connecting line 300b constitutes a middle point of the fist-phase coil pole 60, and the connecting line 300c constitutes a middle point of the third-phase coil pole 62.

Figure 4B:
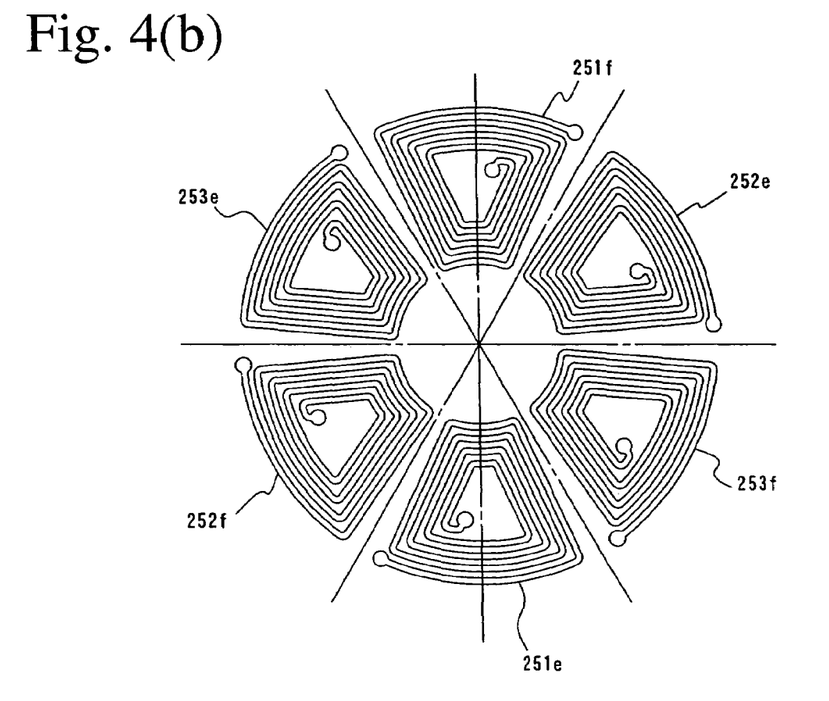
FIG. 4(b) is an enlarged plan view showing another example of pluralities of coils formed on an insulator layer of the laminated coil of the present invention.

Disposed on the second layer is a third layer, on which pluralities of coils are formed. In this embodiment, as shown in FIG. 4(b), pluralities of coils are six coils 251e, 252e, 253e, 251f, 252f, 253f constituting three-phase coil poles on the same layer at an interval of 60° around the motor shaft, each being a four-turn spiral coil.

The third coil patterns 251f, 252f, 253f wound clockwise from inside to outside on the third layer overlap the first coil patterns 251h, 252h, 253h wound clockwise from outside to inside on the second layer in a lamination direction. The fourth coil patterns 251e, 252e, 253e formed on the third layer (wound clockwise from inside to outside) overlap the second coil patterns 251g, 252g, 253g formed on the second layer (wound clockwise from outside to inside) in a lamination direction. The corresponding coils on the second and third layers are connected via through-holes in the same winding direction.

Both of the third coil patterns 251f, 252f, 253f and the fourth coil patterns 251e, 252e, 253e are wound clockwise from inside to outside, and these are called the first coil in the laminate coil of the present invention.

Coils on the fourth layer are substantially the same as those on the second layer, and coils on the fifth layer are substantially the same as those on the third layer.

As spiral coils of the same phase formed on the second to fifth layers and overlapping in a lamination direction, for instance, coil patterns 251a, 251c, 251e, 251g are constituted by the first coil pattern 251a wound clockwise from inside to outside, the second coil pattern 251c connected to the outer end of the first coil pattern 251a and wound clockwise from outside to inside, the third coil pattern 251e connected to the inner end of the second coil pattern 251c and wound clockwise from inside to outside, and the fourth coil pattern 251g connected to the outer end of the third coil pattern 251e and wound clockwise from outside to inside. Because all coil patterns are wound in the same direction, electric current flows in the first and second coils in one direction.

In this embodiment, coil poles of the same polarity each having 4 turns, which are formed in two-dimensionally different regions, are connected to have 32 turns per one phase, thereby making it possible to provide a motor with high torque. The number of turns of the coils can be easily adjusted by increasing or decreasing the number of layers, on which the coils are formed.

Figure 5A:
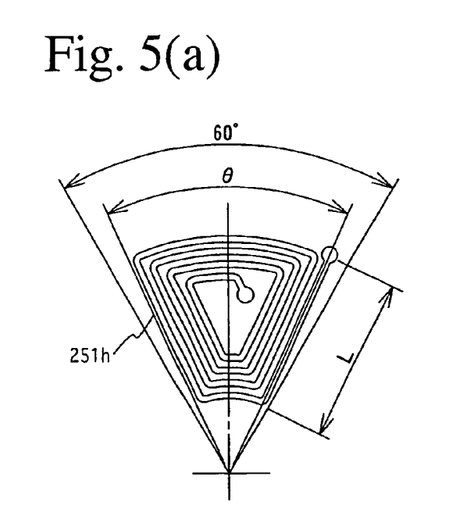
FIG. 5(a) is an enlarged view showing a first coil of the laminated coil according to one embodiment of the present invention.
Figure 5B:
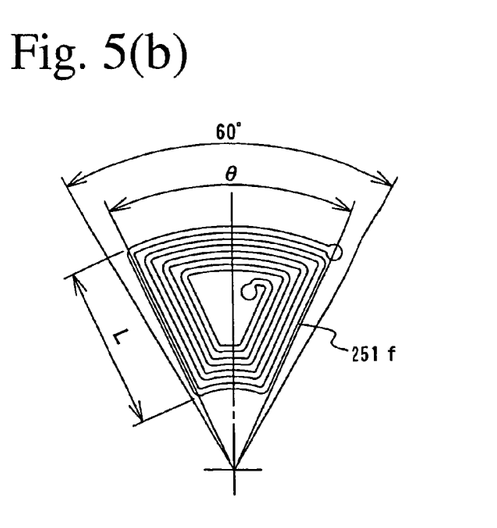
FIG. 5(b) is an enlarged view showing a second coil of the laminated coil according to one embodiment of the present invention.

The detailed structure of the coil will then be explained. FIG. 5(a) shows the first coil pattern 251h formed on the second layer, and FIG. 5(b) shows the third coil pattern 251f formed on the third layer.

In this embodiment, each coil is a four-turn spiral coil. To improve torque performance, the number of turns in each coil is preferably as many as possible. However, if a conductor pattern constituting each coil is made narrower to increase the number of turns, DC resistance increases. In addition, a coil-forming region is restricted by the number of phases and size of the motor. Therefore, the number of turns in each coil is preferably 2 to 6.

Each coil is preferably fan-shaped. An open angle θ of each coil is determined by the numbers of phases and coils in the motor, etc., and properly set such that adjacent coils are not in contact with each other. In this embodiment, the open angle θ of each coil is 50°.

Figure 5C:
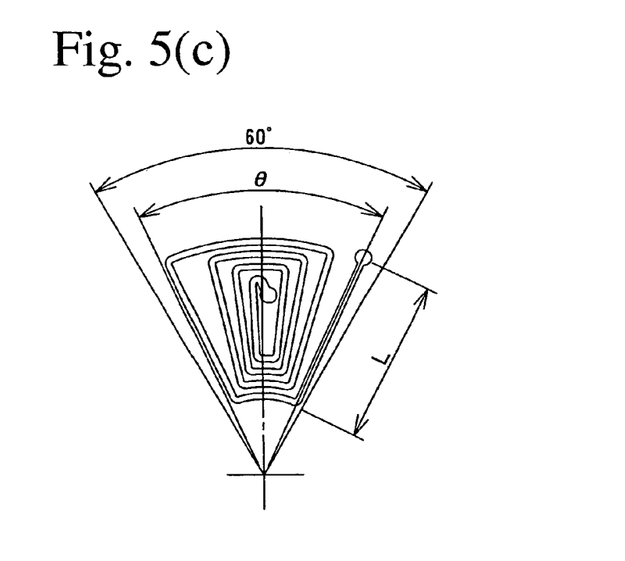
FIG. 5(c) is an enlarged view showing a third coil of the laminated coil according to one embodiment of the present invention.

FIG. 5(c) shows another example of the preferred structures of the coil. When coil line portions (effective length of coil: L) contributing to torque characteristics radially extend from the rotation shaft as a center as shown in the figure, power generated most efficiency acts to rotate the motor, resulting in high torque. Circumferential portions of the coil not contributing to torque characteristics are circular around the motor shaft as a center, so as not to hinder the rotation performance of the motor.

Figure 6:
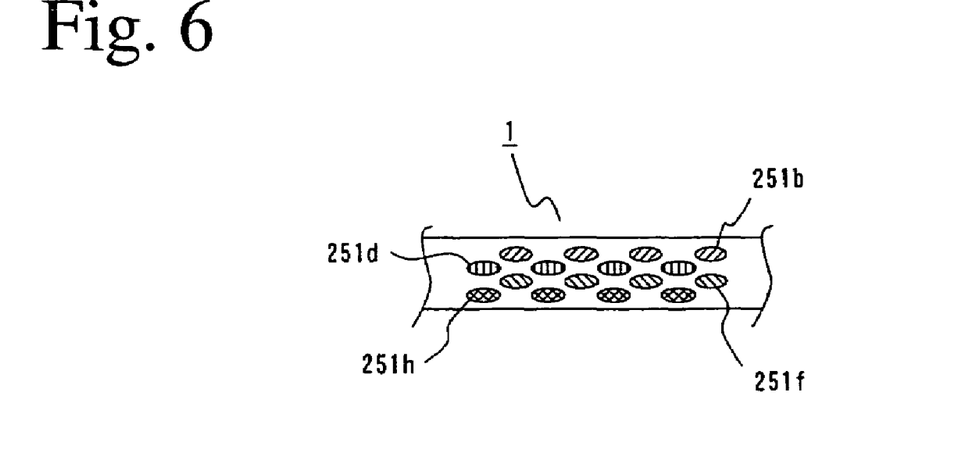
FIG. 6 is a partial cross-sectional view showing the laminate coil according to one embodiment of the present invention.

FIG. 6 is a partial cross-sectional view showing the laminate coil. As shown in FIG. 6, coils of the same phase are preferably laminated in a staggering manner such that their conductors do not overlap in a lamination direction. In a case where there are small gaps between the coils adjacent in a lamination direction, the arrangement and compression of the coils such that their conductors overlap in a lamination direction cause the deformation of the coil conductors, resulting in uneven compression power between portions having the conductors and those having no conductors, and thus the likelihood of delamination (peeling of layers) and small cracking. Accordingly, when constituted as shown in FIG. 6, the deformation and strain of coil conductors are reduced, thereby suppressing delamination, etc.

Because the green sheets are deformed more easily than the coil conductors, the lamination of the coils in a staggering manner can make the gaps of the coil patterns 251b, 251d, 251f, 251h narrower, resulting in a substantially dense formation of coils and thus increased conductor occupancy.

The same conductive paste as that for the coils is printed on the uppermost layer (sixth layer) to form an input terminal IN and output terminals OUT1 to OUT3, and the first connecting line for connecting the coil poles. The first connecting line is constituted by an annular conductor portion 210 surrounding the through-hole 10 formed substantially in a center portion of the laminate, a first conductor portion 200 connecting the annular conductor portion 210 and the input terminal IN, and second conductor portions 201a, 201b, 201c extending from the annular conductor portion 210 and connected to the coil poles.

Figure 3:
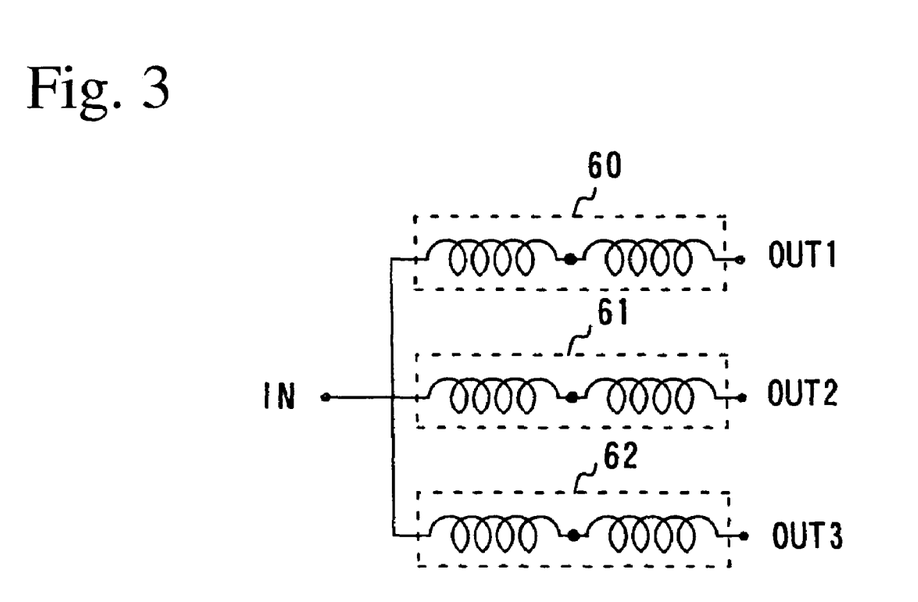
FIG. 3 is a schematic view showing an equivalent circuit of the laminated coil shown in FIG. 1.
Figure 8:
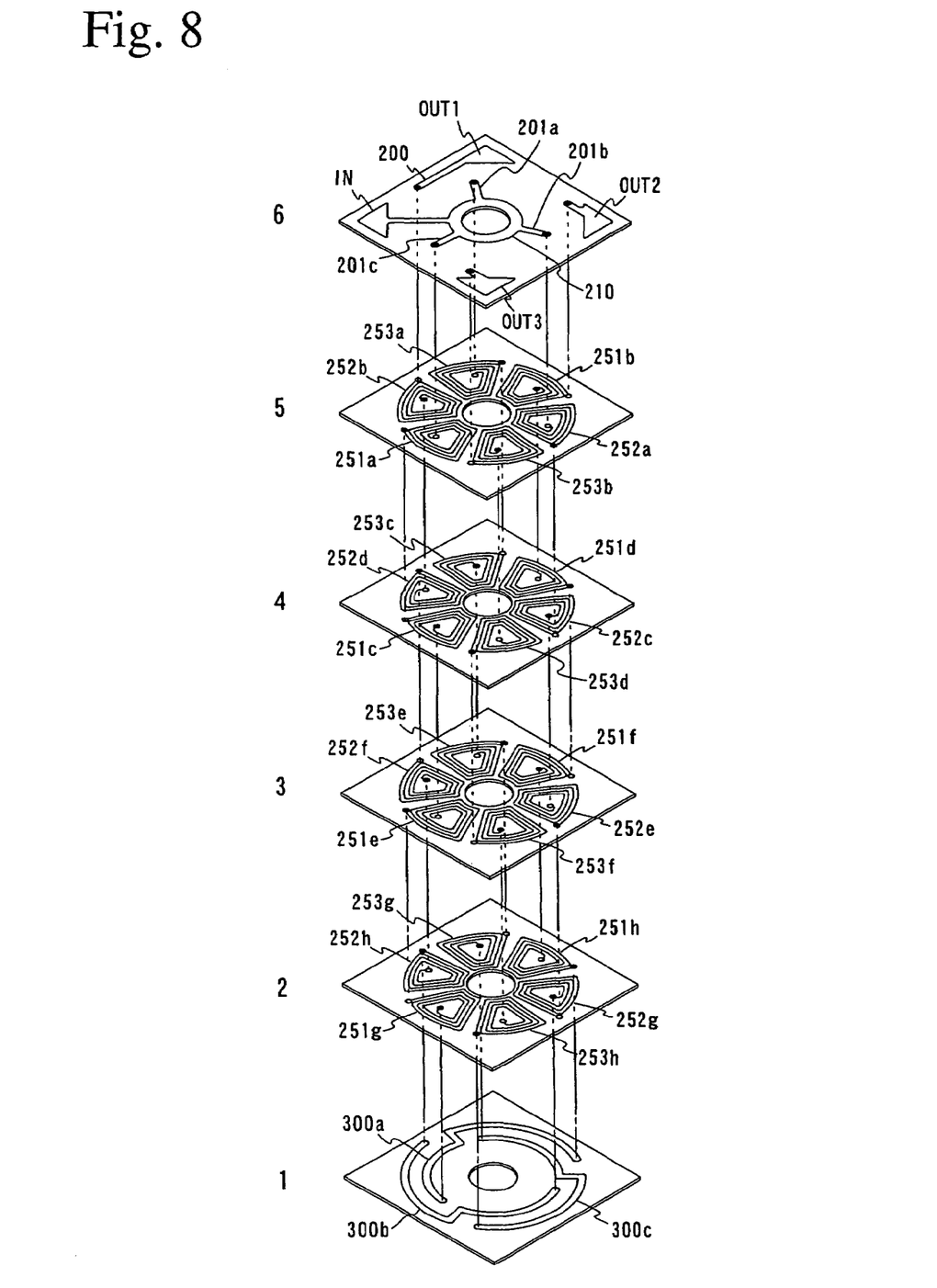
FIG. 8 is an exploded perspective view showing the internal connection of the laminate coil according to one embodiment of the present invention.

Thus, as shown in FIGS. 3 and 8, the first-phase coil pole 60 arranged between the input terminal IN and the output terminal OUT1 was formed by the coils 252a to 252h, the second-phase coil pole 61 arranged between the input terminal IN and the output terminal OUT2 was formed by the coils 251a to 251h, and the third-phase coil pole 62 arranged between the input terminal IN and the output terminal OUT3 was formed by the coils 253a to 253h.

Figure 7:
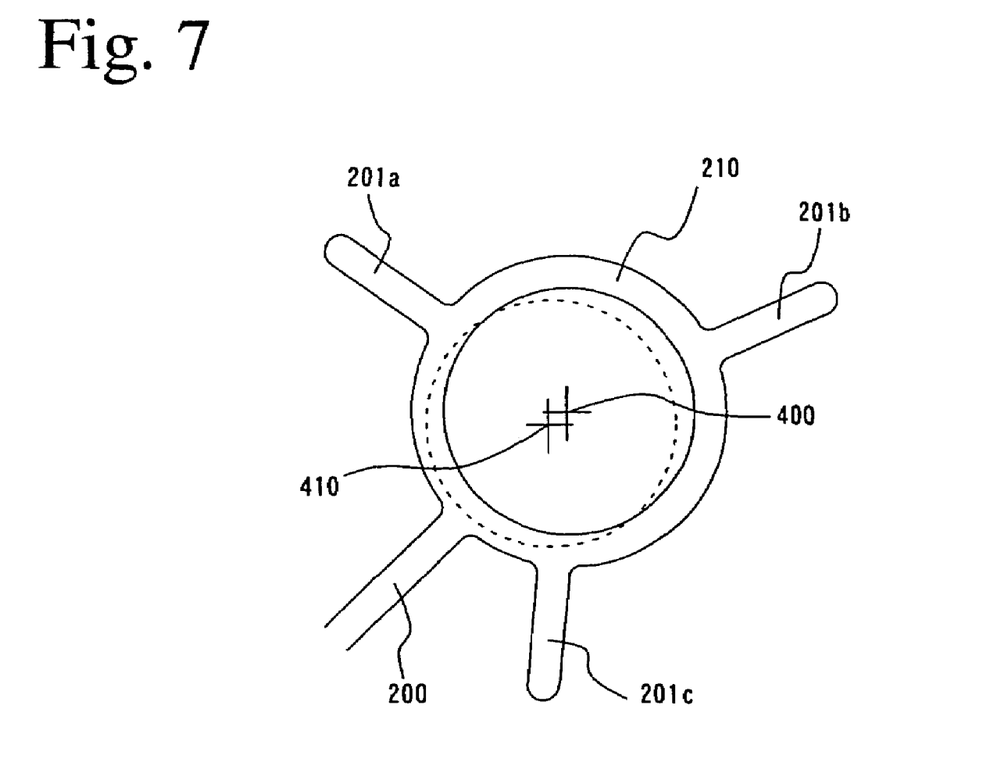
FIG. 7 is an enlarged plan view showing a through-hole of the laminate coil according to one example of the present invention.

The through-hole 10 formed in a substantially center portion of the laminate has a center substantially in alignment with the center of the rotor shaft. Because the through-hole 10 is formed by die-punching or laser-cutting the laminate, etc., in a different step from those forming the coils, the input and output terminals, etc., the through-hole may be displaced from the desired position. In such case, as shown in FIG. 7, the formation of the annular conductor portion 210 such that it surrounds the through-hole 10 makes it easy to confirm the positional displacement of the center 410 of the through-hole 10 from the center 400 of the annular conductor portion 210, and the measurement of the positions of the centers 410, 400 by a measurement equipment such as a three-dimensional meter, etc. the distance of displacement can easily be found. As a result, it can be easily and quantitatively determined whether the laminate coils are good or bad.

Thus, the laminate coil of 8 mm×8 mm×0.3 mm for a brushless motor was produced. The main surface of the laminate coil may be coated with an overcoat glass.

[2] Second Embodiment

Figure 11:
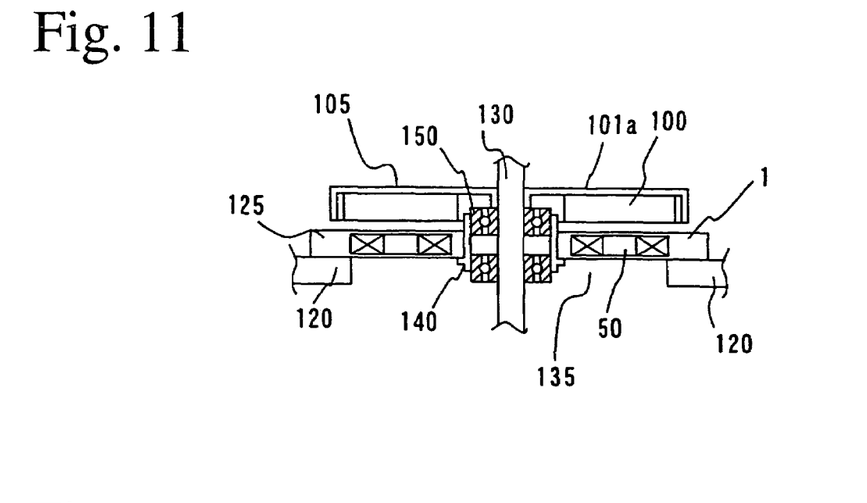
FIG. 11 is a cross-sectional view showing a brushless motor according to one embodiment of the present invention.
Figure 12:
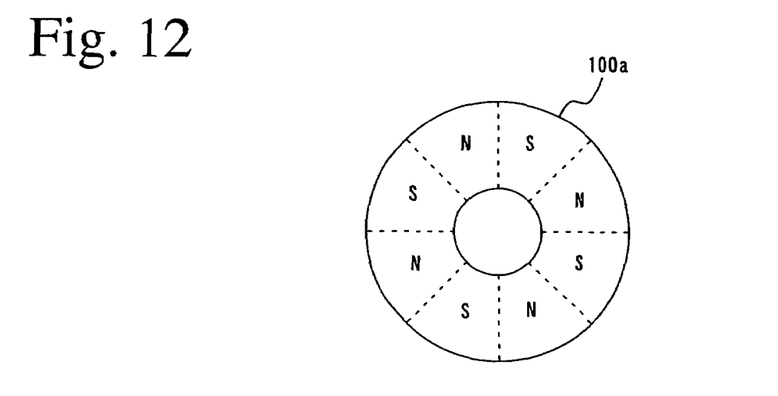
FIG. 12 is a plan view showing an annular magnet used in the brushless motor of the present invention.

FIG. 11 shows one example of a brushless motor constituted by the laminate coil of the present invention. The brushless motor shown in FIG. 11 comprises a first rotor 101a comprising an annular magnet 100 having N and S poles alternately as shown in FIG. 12, which is fixed to a yoke 105a, a rotation shaft 130 connected to a center of the first rotor 101a, a stator 125 comprising a laminate coil 1 facing the first rotor 101a via a predetermined magnetic gap, an electric signal controller (not shown) for periodically supplying driving electric current to coil poles 50 formed in the laminate coil 1, a PCB on which circuit patterns connected to the input and output terminals formed on the laminate coil 1 are formed, and a bearing 150 fixed to the stator 125 via a bushing 140 and supporting the rotation shaft 130 connected to the first rotor 101a such that the first rotor 101a smoothly rotates. This brushless motor uses three driving power sources.

The explanation of the laminate coil 1 per se will be omitted, because it may be the same as in the first embodiment. The annular magnet 100 is preferably made of high-coercivity permanent magnets such as sintered rare earth magnets (sintered Nd—Fe—B magnets, sintered Sm—Co magnets, etc.), bonded rare earth magnets of Nd—Fe—B, Sm—Fe—N, Sm—Co, etc., or sintered ferrite magnets, etc. The use of permanent magnets having a higher intrinsic coercivity iHc than a residual magnetic flux density Br can make the annular magnet 100 thinner. The annular magnet 100 is not restricted to an integral ring magnet, but may be fan-shaped or rectangular magnets obtained by dividing a ring.

A driving electric current is supplied from the electric signal controller to the coil poles 50 in the laminate coil 1, to generate a magnetic field. This magnetic field reacts with a magnetic field of the annular magnet 100 of the first rotor 101a, to generate an electromagnetic force. A torque is thus generated between the first rotor 101a and the stator 125, resulting in the rotation of the first rotor 101a at a predetermined angle. By supplying the driving electric current from the electric signal controller to the coil pole of each phase successively, the first rotor 105a is continuously rotated.

The laminate coil 1 may have lands for magnetic sensors of the first rotor 101a. This magnetic sensor is constituted, for instance, by a hole element. Line patterns connecting the hole element to the PCB, on which circuit patterns are formed, may be formed on the laminate coil 1. A frequency generator (FG) coil may be formed in the laminate coil 1 or on its main surface, and the laminate coil 1 may have a cavity, in which the hole element is disposed.

Thus constituted, a thin, high-output motor can be obtained without having a large magnetic gap between the first rotor 101a and the stator 125.

Because the input and output terminals are formed on one main surface of the laminate coil 1, it may be mounted directly onto the PCB, resulting in easy electric connection of its terminals to the circuit patterns. Further, because the input and output terminals are formed at four corners of one main surface of the laminate coil 1, they may be arranged around the through-holes 135 of the PCB. Because the laminate coil 1 can be made thin by laminating the coils, and because a ceramic material used for the laminate has high bending strength and Young's modulus, even a thin laminate has sufficient strength. Thus, the rotor can be disposed close to the PCB, resulting in a thin motor.

Though the PCB is used in this embodiment, the laminate coil 1 may be formed on a large planar substrate, on which an electric signal controller is disposed.

[3] Third Embodiment

Figure 13:
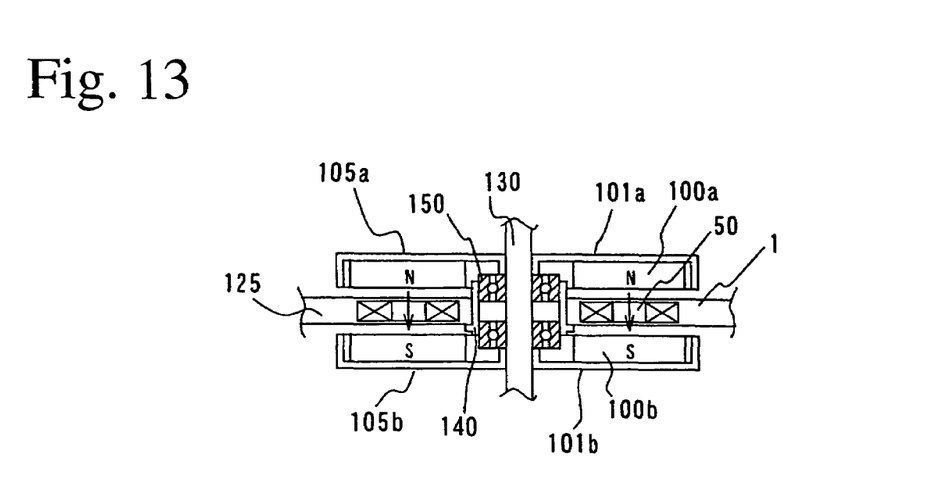
FIG. 13 is a cross-sectional view showing a brushless motor according to another embodiment of the present invention.

FIG. 13 shows a further example of the brushless motor of the present invention. As shown in FIG. 12, this brushless motor comprises a first rotor 101a comprising an annular magnet 100 having N and S poles alternately, which is fixed to a yoke 105a, a second rotor 101b comprising annular magnet 100b, which is fixed to a yoke 105b such that the annular magnet 100b opposes the annular magnet 100a with their opposite poles facing each other, a rotation shaft 130 connected to a center hole of the first rotor 101a and a center hole of the second rotor 101b, a stator 125 facing the first and second rotors 101a, 101b via a predetermined gap and comprising a laminate coil 1 for applying an electromagnetic force of an opposite direction to the first and second rotors 101a, 101b, an electric signal controller for periodically supplying a driving electric current to coil poles 50 formed in the laminate coil 1, a PCB on which circuit patterns connected to input and output terminals formed on the laminate coil 1 are formed, and a bearing 150 fixed to the stator 125 via a bushing 140 and supporting a rotation shaft 130 connected to the first and second rotors 101a, 101b such that the first and second rotors 101a, 101b smoothly rotate. This brushless motor uses three driving power sources.

The laminate coil 1 used in this embodiment is formed on a large planar substrate, on which circuit patterns such as an electric signal controller for periodically supplying a driving electric current, etc. are integrally formed. Because other structures are substantially the same as those of the first embodiment, their explanation will be omitted.

In this double-rotor brushless motor, the stator comprising pluralities of coil poles is arranged substantially at an intermediate point between the first and second rotors 101a, 101b. Each coil pole is arranged such that it attracts or repulses the annular magnets 100a, 100b of the first and second rotors 101a, 101b. Accordingly, the first and second rotors 101a, 101b receive an attraction or repulsion force in an opposite direction at the same level from the stator 125. As a result, vibration in the direction of the rotation shaft is more suppressed than in the single-rotor brushless motor. In this embodiment, too, the stator 125 can be made thin with the same gap between the first rotor 110a and the stator 125, and between the second rotor 101b and the stator 125. Accordingly, a thin motor with little vibration can be obtained.

APPLICABILITY IN INDUSTRY

The laminate coil of the present invention is small and thin with high efficiency, free from uneven rotation and torque ripple, etc., and easily mass-producible. The brushless motor of the present invention using such laminate coil is also thin with little vibration.

What is claimed is:

1. A laminate coil for an integral n-phase motor (n is a natural number of 2 or more) having pluralities of coil poles formed by patterned conductor coils formed in a laminate constituted by pluralities of insulating layers, said laminate coil comprising input and output terminals formed on an outer surface of said laminate, a first connecting line connecting said input terminal to said coil poles, and second connecting lines series-connecting coil poles having the same polarity, said first and second connecting lines being formed by conductor patterns, and said coil poles being formed on pluralities of insulating layers sandwiched by said first and second connecting lines.

2. The laminate coil according to claim 1, wherein the number of said coil poles is an integral multiple of n and equal in each phase.

3. The laminate coil according to claim 1, wherein n is 2 or 3.

4. The laminate coil according to claim 1, wherein it comprises a through-hole for receiving a rotation shaft and/or a bearing of a brushless motor substantially in a center portion of said laminate.

5. The laminate coil according to claim 4, wherein said first connecting line comprises an annular conductor portion surrounding said through-hole, a first conductor portion connecting said annular conductor portion to said input terminal, and second conductor portions extending from said annular conductor portion and connected to said coil poles.

6. The laminate coil according to claim 1, wherein said input and output terminals and said first connecting line are formed on one main surface of said laminate.

7. The laminate coil according to claim 1, wherein each of said second connecting lines comprises two arcuate portions having different radii, and a radial portion connecting said two arcuate portions.

8. The laminate coil according to claim 1, wherein said coil poles are constituted by connecting coils formed on pluralities of insulating layers such that they overlap in a lamination direction, said coil being constituted by at least a first coil wound clockwise from inside to outside and a second coil wound clockwise from outside to inside, said first and second coils being connected via through-holes formed in said laminate, whereby said first and second coils have the same winding direction.

9. The laminate coil according to claim 1, wherein different-phase coil poles are arranged around a motor shaft at an equal angular interval.

10. The laminate coil according to claim 9, wherein coil poles having the same polarity are arranged at rotationally symmetric positions of 180° around a rotation center of said motor shaft.

11. The laminate coil according to claim 1, wherein said coils are fan-shaped spiral coils each having an open angle of 55° or less with said motor shaft as a center.

12. The laminate coil according to claim 1, wherein said laminate is made of low-temperature co-fired ceramic, and formed by laminating and burning green sheets having conductor patterns.

13. The laminate coil according to claim 1, wherein conductor patterns of coils of the same phase are laminated in a staggering manner.

14. The laminate coil according to claim 1, wherein the main surface of said laminate coil is coated with an overcoat glass.

15. A brushless motor comprising the laminate coil of claim 1 as a stator, said laminate coil being arranged such that it opposes a rotor comprising a permanent magnet having different magnetic poles alternately via a magnetic gap.

16. The brushless motor according to claim 15, further comprising an electric signal controller for periodically supplying electric current to each of different-phase coil poles of said laminate coil.

17. A brushless motor comprising the laminate coil of claim 1 as a stator, said brushless motor comprising first and second rotors comprising a permanent magnets having alternately different magnetic poles, and said first and second rotors being arranged such that they oppose to each other with a magnetic gap via said laminate coil.

18. The brushless motor according to claim 17, further comprising an electric signal controller for periodically supplying electric current to each of different-phase coil poles of said laminate coil.

19. A laminate coil for an integral three-phase motor comprising pluralities of coil poles formed by patterned conductor coils in a laminate constituted by pluralities of insulating layers, said laminate being formed in the shape of a quadrangular plate, and each of one input terminal and three output terminals in a land grid array (LGA) or a ball grid array (BGA) being formed at four different corners on the same main surface of said laminate.

* * * * *